D. G. PICKETT.
Grass-Seed Sower.
No. 81,942.
Patented Sept. 8, 1868.
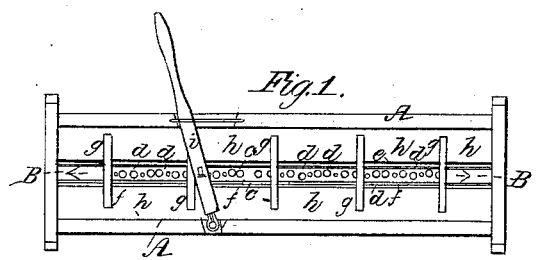
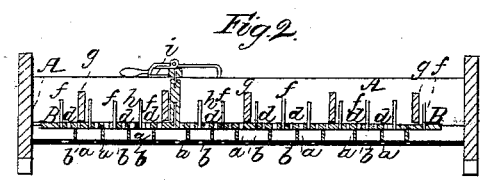
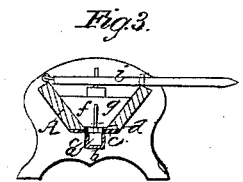

United States Patent Office.

DARIUS G. PICKETT, OF STOCKTON, NEW YORK.

Letters Patent No. 81,942, dated September 8, 1868.

---

IMPROVEMENT IN GRASS-SEED SOWER.

---

The Schedule referred to in these Letters Patent and making part of the same.

---

TO ALL WHOM IT MAY CONCERN:

Be it known that I, DARIUS G. PICKETT, of Stockton, in the county of Chautauqua, and State of New York, have invented a certain new and useful Improvement in Grass-Seed Sowers; and I do hereby declare that the following is a full and exact description thereof, reference being had to the accompanying drawings, making part of this specification, in which—

Figure 1 is a plan of my improved seed-sower.

Figure 2 is a longitudinal section, and

Figure 3 a cross-section.

Like letters of reference indicate corresponding parts in all the figures.

My invention consists in combining with the reciprocating slide an arrangement of pins and holes for delivering the seed freely, and a series of cross-partitions or diaphragms in the hopper, for retaining the seed in place as it is acted upon by the pins.

In the drawings, A indicates the hopper, which is attached to the person of the operator by a suitable strap, and B indicates the slide, having cross-teeth or flanges, $a\ a$, which run over the seed-holes $b\ b$ and scatter the seed as it passes through. A space, $c$, is left at each side of the seed-slide to allow the seed to properly fall down, and the slide is also provided with vertical holes $d\ d$ for the same purpose.

From the top of the slide, pins $f f f$ project upward through the mass of seed in the hopper, and at suitable distances apart the hopper is provided with cross-partitions or diaphragms, $g\ g\ g$, thus forming chambers, $h\ h\ h$, in each of which several of the pins play, acting as stirrers, as the slide is reciprocated by handle $i$.

Many kinds of grass-seed are of a furry and clinging nature, and it is found difficult to work them down through the narrow space around the slide, so as to discharge regularly and uniformly. It is my special object, by the use of these pins $f f$ and holes $d\ d$, to secure this result more perfectly than could otherwise be done, the pins, by their sliding movement, producing the desired agitation, while the holes allow a free vertical passage in addition to the side passages $c\ c$.

To produce a still better effect, I combine with the pins the series of cross-partitions, $g\ g$, in the hopper, placed at short intervals, so that but few of the pins shall play in each compartment, and by this means I hold the seed in place against the longitudinal action, and prevent the knotting or concentration of the same by clinging together. They also serve as a resistance for the pins to act against, whereby a more effective feeding of the seed downward is insured. The use of these diaphragms also prevents the seed from massing at either end, which would otherwise frequently occur, especially from the operator carrying the hopper in an inclined position. Other seed-sowers, in their action, destroy a large portion of the seed by rubbing off the outer coat. Mine does not.

I am aware that a reciprocating slide with cross-teeth has been employed for sowing grass-seed, as in the patent of J. C. Gaston. I am also aware that various forms of agitators have before been employed. Such I generally disclaim; but

What I claim as my invention, and desire to secure by Letters Patent, is—

The combination, with the seed-slide B, of the pins $f f$, holes $d\ d$, and cross-partitions $g\ g$, the whole arranged as described, and operated in the manner and for the purpose specified.

In witness whereof, I have hereunto signed my name in the presence of two subscribing witnesses.

DARIUS G. PICKETT.

Witnesses:
 JOSEPH C. RUSS,
 JAMES D. DUNCAN.